(12) United States Patent
Makonahalli et al.

(10) Patent No.: US 9,063,808 B2
(45) Date of Patent: Jun. 23, 2015

(54) DEPLOYING A PACKAGE FOR A SOFTWARE APPLICATION

(75) Inventors: Manjunath Makonahalli, Acton, MA (US); Sarmistha Samantaray, Lexington, MA (US); Sampathkumar Sriramadhesikan, Burlington, MA (US); Xinyu Wu, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 2088 days.

(21) Appl. No.: 12/120,817

(22) Filed: May 15, 2008

(65) Prior Publication Data

US 2009/0288078 A1    Nov. 19, 2009

(51) Int. Cl.
G06F 9/445    (2006.01)
G06F 17/30    (2006.01)

(52) U.S. Cl.
CPC ............ *G06F 8/60* (2013.01); *G06F 17/30194* (2013.01); *G06F 9/445* (2013.01); *G06F 9/44505* (2013.01)

(58) Field of Classification Search
CPC ............... G06F 8/60; G06F 8/61; G06F 8/65; G06F 8/71; G06F 9/4405; G06F 17/30194
USPC .............. 707/513, 1; 717/747, 170, 174, 103, 717/102, 121
See application file for complete search history.

(56) References Cited

U.S. PATENT DOCUMENTS

| | | | |
|---|---|---|---|
| 6,269,473 B1 | 7/2001 | Freed et al. | |
| 7,463,940 B2 | 12/2008 | Tanartkit et al. | |
| 7,644,050 B2 | 1/2010 | Berg et al. | |
| 7,873,649 B2 | 1/2011 | Krishnaprasad et al. | |
| 8,347,263 B1 * | 1/2013 | Offer | 717/104 |
| 2002/0078094 A1 * | 6/2002 | Krishnaprasad et al. | 707/513 |
| 2003/0014397 A1 * | 1/2003 | Chau et al. | 707/3 |
| 2003/0018950 A1 | 1/2003 | Sparks et al. | |
| 2005/0065937 A1 | 3/2005 | Degenaro et al. | |
| 2005/0166196 A1 * | 7/2005 | Grier et al. | 717/162 |
| 2006/0009991 A1 | 1/2006 | Jeng et al. | |
| 2006/0020937 A1 * | 1/2006 | Schaefer | 717/175 |
| 2006/0075087 A1 | 4/2006 | Kaiser et al. | |

(Continued)

FOREIGN PATENT DOCUMENTS

WO    WO 0246909 A1 *    6/2002

OTHER PUBLICATIONS

Shan et al., "Service-Oriented Framework for Internet Applications", IEEE International Conference on Service-Oriented Computing and Applications, (SOCA'07), Jun. 2007, pp. 295-302.

(Continued)

*Primary Examiner* — John Breene
*Assistant Examiner* — Lynda Dinh
(74) *Attorney, Agent, or Firm* — Yee & Associates, P.C.; Jeffrey S. LaBaw (57) ABSTRACT

A computer implemented method, apparatus, and computer usable program code for deploying packages. In response to a request to deploy a package for a software application containing metadata, a first portion of the metadata describing the package is processed. A second portion of the metadata relating to modification of a database is processed for the software application after processing the first portion of the metadata. A third portion of the metadata describing all other content for the software application is processed after processing the second portion of the metadata.

15 Claims, 6 Drawing Sheets

(56) References Cited

U.S. PATENT DOCUMENTS

| | | | |
|---|---|---|---|
| 2006/0123017 | A1 | 6/2006 | Berg et al. |
| 2006/0161909 | A1 | 7/2006 | Pandey et al. |
| 2006/0212843 | A1 | 9/2006 | Zaky et al. |
| 2007/0239293 | A1 | 10/2007 | Tanartkit et al. |
| 2007/0260629 | A1 | 11/2007 | Tseitlin et al. |
| 2008/0082959 | A1 | 4/2008 | Fowler |
| 2009/0138874 | A1* | 5/2009 | Beck et al. .................... 717/173 |

OTHER PUBLICATIONS

Da Silveira et al., "A Metacomponent Model to Support the Extensibility and Evolvability of Networked Applications," IEEE Tools 34, Proceedings of the 34th International Conference on Technology of Object-Oriented Languages and Systems, Aug. 2002, pp. 185-194.

Scherer, "Internet-Wide Software Component Development Process and Deployment Integration," Dissertation, Swiss Federal Institute of Technology Zurich, Zurich, Switzerland, 1998, pp. 1-204.

"Transport Control Program tp," SAP Library—Technical Operations Manual for mySAP Technology, http://help.sap.com/saphelp_47x200/helpdata/en/3d/ad5a8a4ebc11d182bf0000e829fbfe/frameset.htm, accessed Feb. 8, 2012, 33 pages.

"Transport Organizer—Concept," SAP Library—Technical Operations Manual for mySAP Technology, http://help.sap.com/saphelp_47x200/helpdata/en/57/38dd924eb711d182bf0000e829fbfe/frameset.htm, accessed Feb. 8, 2012, 40 pages.

Da Silveira et al., "A Metacomponent Model to Support the Extensibility and Evolvability of Networked Applications", Proceedings of the 34th International Conference on Technology of Object-Oriented Languages and Systems—Tools 34, pp. 185-194, IEEE Computer Society 2000.

* cited by examiner

DEPLOYING A PACKAGE FOR A SOFTWARE APPLICATION

BACKGROUND OF THE INVENTION

1. Field of the Invention

The present invention relates generally to an improved data processing system and more specifically to a method and apparatus for processing data. Still more particularly, the present disclosure relates to a computer implemented method, apparatus, and computer usable program code for deploying a business application.

2. Description of the Related Art

With the Internet and other networks, the use of application servers has become common place. An application server is a software process that delivers applications to client computers or devices. An application server may be a process in a client and server environment that performs business logic or other logic processing. Typically, the application server performs the logic processing with the client performing the role of a user interface through the use of a browser or other client application.

Application management in this type of environment includes configuring and customizing an application to meet the requirements of end users. This type of configuration and customization may be performed in a development environment. From the development environment, the application may be promoted to a test environment to perform user acceptance testing. From this test environment, an application may be promoted to a production environment in which the application is put into use by end users.

Application management in the context of a rollout into a production environment is a complex process. Many different information technology teams may be involved including, for example, database administrators, server administrators, business application managers, and developers. The deployment of the application into the production environment includes minimizing disruptions to the environment itself. Further, the process may involve optimizing the use of tool and information technology resources. Another goal in this type of process is to reduce the amount of time needed to deliver a complete business application to the end users.

In promoting an application into a user acceptance test environment and/or production environment, a process to perform this promotion may be manual or automated. With a manual process, an application may be promoted using various scripts, exporting and importing data using flat files or extensible markup language formatted files, and checking in and checking out of code from source control systems. An automated rollout of an application into different environments may be used when dedicated application management and change management tools are available. In an automated process, various software application promotion tools may be used in which these tools provide dedicated deployment packages.

Automated tools currently exist from various vendors to deploy an application into a production environment. These types of tools, however, are complex and require larger information technology teams with specialized training and skills to run the tools as compared to a manual process. A number of different tools may be launched and operate in conjunction to promote or move the business application into a production environment further increasing the complexity of the rollout. These tools provide extensive support for the deployment of code-based application artifacts but only limited support for content-based application artifacts.

Therefore, it would be advantageous to have a computer implemented method, apparatus, and computer usable program code to reduce the complexity in deploying a business application into an environment.

BRIEF SUMMARY OF THE INVENTION

The illustrative embodiments provide a computer implemented method, apparatus, and computer usable program code for deploying packages. In response to a request to deploy a package for a software application where the application characteristics are expressed as metadata, a first portion of the metadata describing the package is processed. A second portion of the metadata relating to modification of a database is processed for the software application after processing the first portion of the metadata. A third portion of the metadata describing all other application characteristics is processed after processing the second portion of the metadata.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
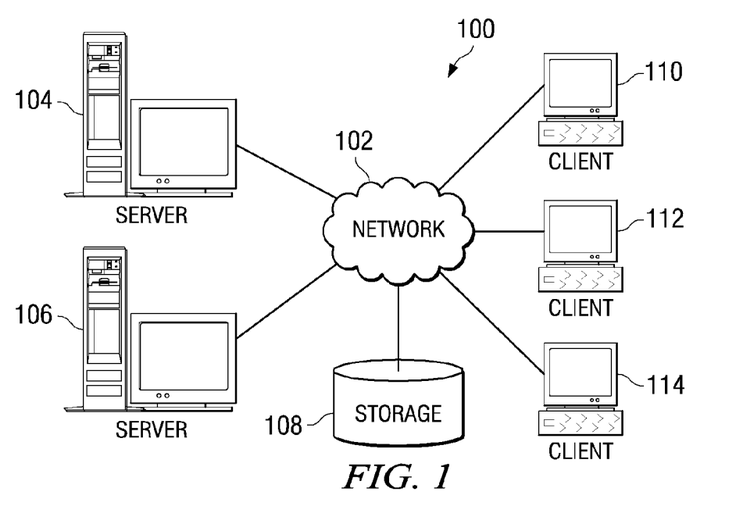
FIG. 1 is a pictorial representation of a network of data processing systems in which illustrative embodiments may be implemented.
Figure 2:
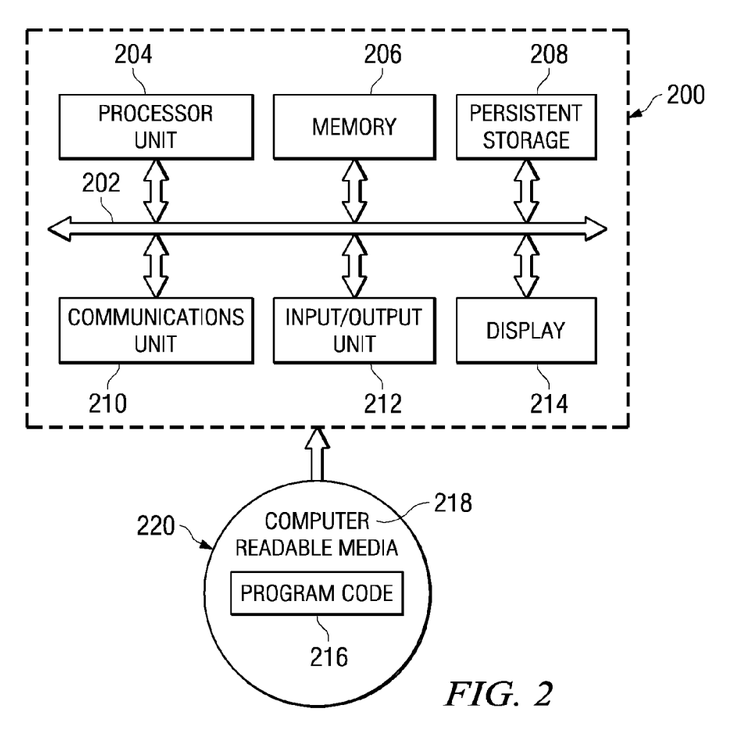
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, clients 110, 112, and 114 connect to network 102. Client computers 110, 112, and 114 may be, for example, personal computers or network computers. In the depicted example, server computer 104 provides data, such as boot files, operating system images, and applications to client computers 110, 112, and 114. Client computers 110, 112, and 114 are clients to server computer 104 in this example. In this illustrative example, server computer 104 and server computer 106 may host application servers, which may provide applications to clients, such as client computers 110, 112, and 114. Further, server computer 104 and server computer 106 also may have different environments such as development environments, test environments, and production environments. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

The different embodiments can also take the form of a computer program product which has been downloaded over a network from one device to another for use in the other device. For instance, the program code stored in a computer readable storage medium in a server data processing system may be downloaded over a network from the server data processing system to a remote data processing system, such as a client or another server. Likewise, the program code stored in a computer readable storage medium in a client data processing system may be downloaded over a network from the client to a remote data processing system, such as a server computer or another client computer.

With reference now to FIG. 2, a block diagram of a data processing system is shown in which illustrative embodiments may be implemented. Data processing system 200 is an example of a computer, such as server computer 104 or client computer 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that currently used processes for moving applications from one environment to another environment may be complex, time consuming, and/or costly. Thus, the different illustrative embodiments provide a computer implemented method, apparatus, and computer usable program code for distributing packages for use in deploying an application. A package contains metadata of various types each of which characterize an application. A first portion of metadata in a package is processed in response to a request to deploy the package for the software application. This first portion of the metadata describes the package. A second portion of the metadata relating to a modification of a database for the software application is processed after processing the first portion of the metadata. A third portion of the metadata describing all other characteristics of the application is processed after processing the second portion of the metadata.

In this manner, all of the metadata is contained in a single package and may be deployed in the correct order. Further, the different illustrative embodiments provide an ability to validate this content during the deployment. This ability to process content may be performed with content created by clients as well as those created by developers. This process does not require additional software tools or utilities as with currently used methods.

In summary, the process for deploying a package may be executed when a package is deployed for a software solution. An end user may trigger the deployment of the package through a single request without requiring further user interaction.

Figure 3:
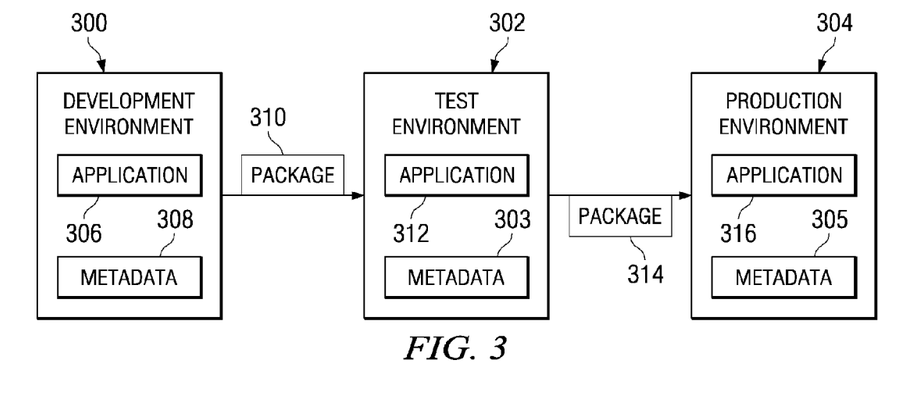
FIG. 3 is a diagram of different application environments in accordance with an illustrative embodiment.

With reference now to FIG. 3, a diagram of different application environments is depicted in accordance with an illustrative embodiment. In this example, development environment 300, test environment 302, and production environment 304 are examples of environments in which packages may be implemented to deploy applications. In this example, application 306 may be developed or created in development environment 300. Development environment 300, test environment 302, and production 304 may be implemented on data processing systems, such as data processing system 200 in FIG. 2. Various programmers and developers may create applications, such as application 306, within development environment 300.

Application 306 may be described using metadata 308. This metadata may be placed into package 310 and moved or sent to test environment 302. Package 310 may be deployed to install application 312 in test environment 302. In test environment 302, various types of testing may be performed on application 312 to ensure that application 312 is capable of meeting various requirements. These requirements may include, for example, running scripts, performing stress tests, and other suitable processes to determine whether application 312 is acceptable for use in production environment 304. If application 312 is suitable for use in production environment 304, package 314 may be sent to production environment 304 and deployed as application 316 for use by end users. Package 314 in these examples contains the same metadata as package 310 with audit updates. Examples of audit data include, for example, on what system the package was originally created and where it is currently installed for testing; who created/deployed the package; and where the package was regenerated for further downstream deployment in production environment. Metadata 303 is available in test environment 302 and metadata 305 is available in production environment 304 as a result of applications 312 and 316 being deployed into those respective environments. This metadata is used to run applications 312 and 316 and make them available to the end user.

Figure 4:
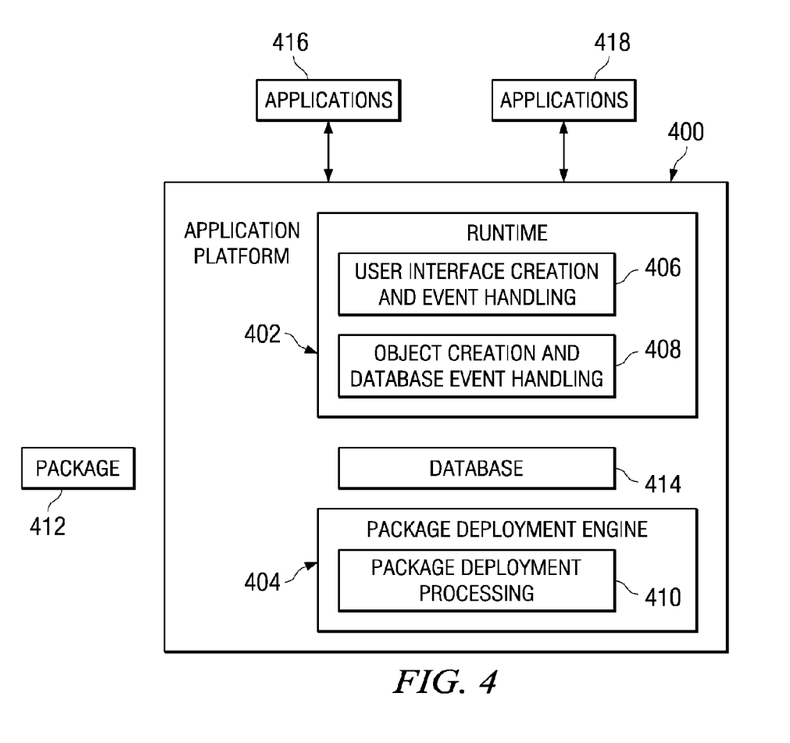
FIG. 4 is a diagram illustrating an application platform in accordance with an illustrative embodiment.

With reference now to FIG. 4, a diagram illustrating an application platform is depicted in accordance with an illustrative embodiment. In this example, application platform 400 is an example of an application platform that may be found in various environments. These environments include, for example, development environment 300, test environment 302, and production environment 304. Tivoli Maximo and Tivoli Change and Configuration Management Database (CCMDB) are examples of application platform product. These application platform products are available from International Business Machines Corporation. In these examples, an application platform is a software ecosystem in which a number of cooperating software components executes to deliver software applications to end users.

In this illustrative example, application platform 400 includes runtime 402 and package deployment engine 404. Runtime 402 includes user interface creation and event handling 406 and object creation and database event handling 408. Package deployment engine 404 includes package deployment processing 410. Package deployment engine 404 may execute package deployment processing 410 to deploy package 412. Deployment of package 412 in this example creates new tables, columns, views as well as data in database 414.

In these examples, application platform 400 may execute on one data processing system, while applications 416 and 418 may execute on other data processing systems. In other advantageous embodiments, application platform 400, application 416, and application 418 may be located on the same data processing system. Application 416 and application 418 in these examples may be web based applications that execute through a browser. In this type of implementation, application 416 and application 418 are user interfaces in which the logic is executed through user interface creation and event handling 406 and object creation and database handling 408.

User interface creation and event handling 406 may create user interfaces for applications 416 and 418 using information from database 414. This component may handle events detected through user input into applications 416 and 418 as well as returning response events for presentation by those applications. Database 414 may be used by runtime 402 to present applications 416 and 418 to end users. Database 414 may take various forms. For example, database 414 may be a relational database or an extensible markup language database.

Object creation and database event handling 408 may query database 414 to create various objects in presenting application 416 and 418. Workflow, notification, actions are some of the examples of objects that may be created for the application. In addition, application user interface tabs, windows, menus, buttons are examples of other objects that may be created for the application. Also, fields in the application user interface windows may provide lookups to quickly locate data that can be placed in the field. Security restrictions which determine if a field is editable or read-only in a particular window are also retrieved from the database and configured as objects for the application.

In this illustrative example, package 412 contains all of the content for an application, such as application 416 and application 418. Also, the content in package 412 is arranged or identified with an order for processing or deployment by package deployment processing 410. The deployment of package 412 by package deployment processing 410 may execute without requiring user intervention within application platform 400. Package deployment processing 410 processes all the content in package 412 in the order specified without the need for other software tools or utilities to create runtime 402.

As mentioned above, content in package 412 is metadata in these examples. This metadata may be stored in various data structures. For example, the metadata may be stored within extensible markup language documents placed within package 412.

In this depicted example, application 416 and application 418 may be different instances of the same application. In other illustrative examples, application 416 and application 418 may be different applications that have been deployed on application platform 400.

Figure 5:
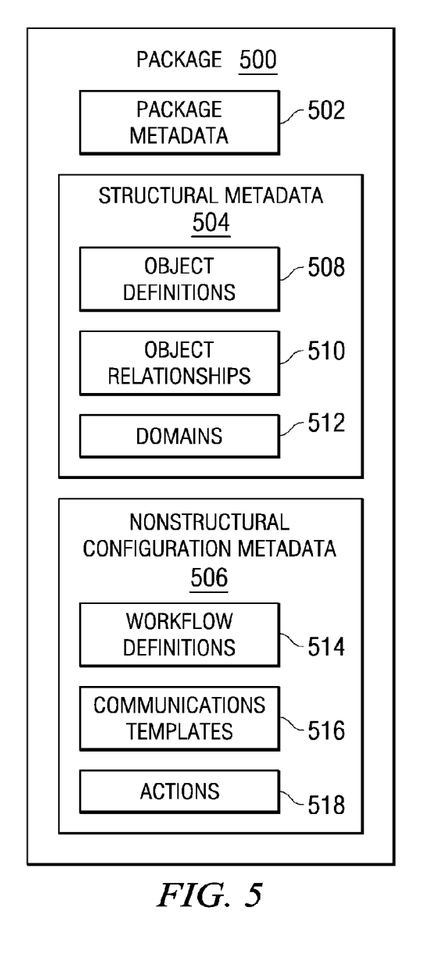
FIG. 5 is an illustration of a package in accordance with an illustrative embodiment.

With reference now to FIG. 5, an illustration of a package is depicted in accordance with an illustrative embodiment. Package 500 is an example of one implementation of package 412 in FIG. 4. In this example, package 500 includes package metadata 502, structural metadata 504, and nonstructural configuration metadata 506. Package metadata 502 describes package 500. In other words, package metadata 502 may summarize or describe the content within package 500. Package metadata 502 is used to prepare a context for a complete deployment of package 500.

Structural metadata 504 describes the data that may modify the structure of the underlying database of the application. In this example, structural metadata 504 includes object definitions 508, object relationships 510, and domains 512. Object definitions 508 include, for example, definitions used to construct or modify database entities such as, for example, tables, views, columns, queues, indexes, sequences, and other suitable entities. Object relationships 510 may describe the relationships between the different objects. Domains 512 are valid data used in the object definitions. Domains 512 contain data that are validated when entered into certain fields.

Nonstructural configuration metadata 506 describes data that may take the form of rows in various tables within the database. Nonstructural configuration metadata 506 may include information such as workflow definitions 514, communications templates 516, and actions 518. Workflow definitions 514 may define various workflows that can automate application actions or enforce business rules. Communications templates 516 may define communications such as, for example, email notifications. Actions 518 are some of the business logic applied during workflow executions, such as changing of a status of a record from its current status to the next valid status. Other examples of nonstructural configuration metadata 506 include, for example, data for user interface definitions, data to validate values entered into fields, data for automation capabilities, data for determining user authorization and authentication, data for the construction of key performance indicators, reports, and data to integrate the application with other systems.

Figure 6:
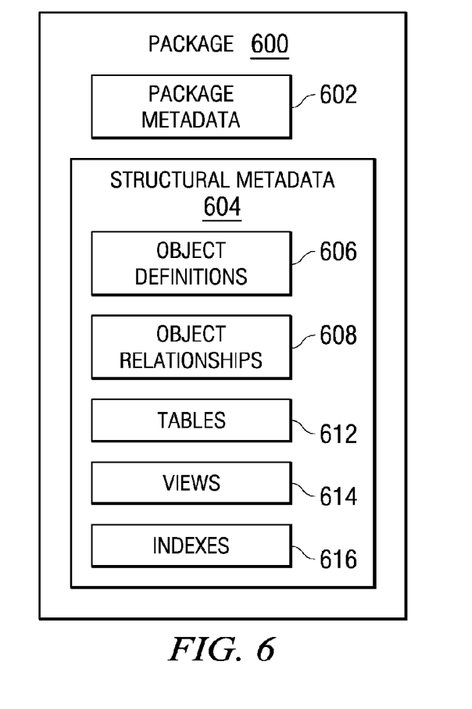
FIG. 6 is an illustration of a package in accordance with an illustrative embodiment.

With reference now to FIG. 6, an illustration of a package is depicted in accordance with an illustrative embodiment. Package 600 is an example of another implementation of package 412 in FIG. 4. In this example, package 600 includes package metadata 602 and structural metadata 604. In this example, structural metadata 604 may include object definition 606, object relationships 608, tables 612, view 614, and indexes 616. In these examples, tables 612 contain various entries and/or objects. An example of a table within table 612 includes, for example, a work flow table. A view within view 614 is a database view that may be defined on one or more tables within table 612. Indexes 616 are database objects defined in a table to aid in retrieving records rather than searching an entire table. In this example, package 600 does not include nonstructural configuration metadata. The different packages in the different illustrative embodiments are not required to include all three types of metadata. Each package in these examples always includes package metadata.

Figure 7:
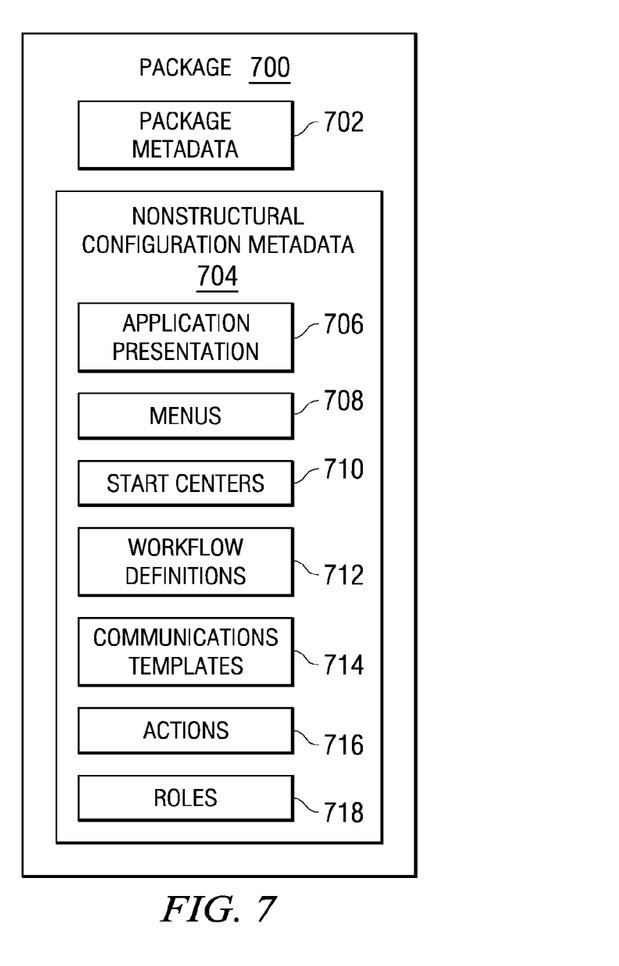
FIG. 7 is another illustration of a package in accordance with an illustrative embodiment.

With reference to FIG. 7, another illustration of a package is depicted in accordance with an illustrative embodiment. Package 700 is an example of one implementation of package 412 in FIG. 4. In this example, package 700 includes package metadata 702 and nonstructural configuration metadata 704. Nonstructural configuration metadata 704 in this example includes application presentation 706, menus 708, start centers 710, workflow definitions 712, communications templates 714, actions 716, and roles 718. Application presentation 706 contains data used to generate presentations to a user through a user interface. Menus 708 include data for various menus that may be presented through application presentation 706. A start center in start centers 710 is a configurable user interface that displays the different application components to a user. Various users can configure their start center to look differently as well as display different data. A start center is akin to a dashboard. When a user logs in to a software application, the start center presents information and controls such as short cuts, charts, and summary data that aid in user's decision making. Roles 718 define the roles of a person. The roles include, for example, purchasing agent, supervisor, system administrator, and other suitable roles. These roles are linked to various people in these examples.

Figure 8:
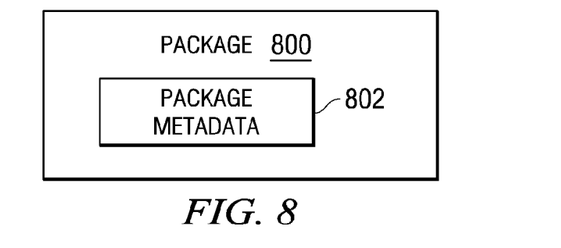
FIG. 8 is another diagram of a package in accordance with an illustrative embodiment.

Turning next to FIG. 8, another diagram of a package is depicted in accordance with an illustrative embodiment. Package 800 is another example of an implementation for package 412 in FIG. 4. In this example, package 800 only includes package metadata 802. The illustration of packages 500, 600, 700, and 800 are provided as illustrations of some configurations for a package according to an illustrative embodiment. The illustration of these different examples is not meant to limit the manner in which packages may be constructed and the content in the packages. Other packages may include other content than that illustrated in these examples. Further, other packages in other implementations may include more content or less content than those illustrated for the different types of metadata.

Thus, in the different illustrative examples of packages in FIGS. 5-8, a package may only include the content needed for a particular application. In some cases, packages may be used to modify or change features provided by an application. With these types of changes, a complete package with all three types of metadata may not be needed.

Figure 9:
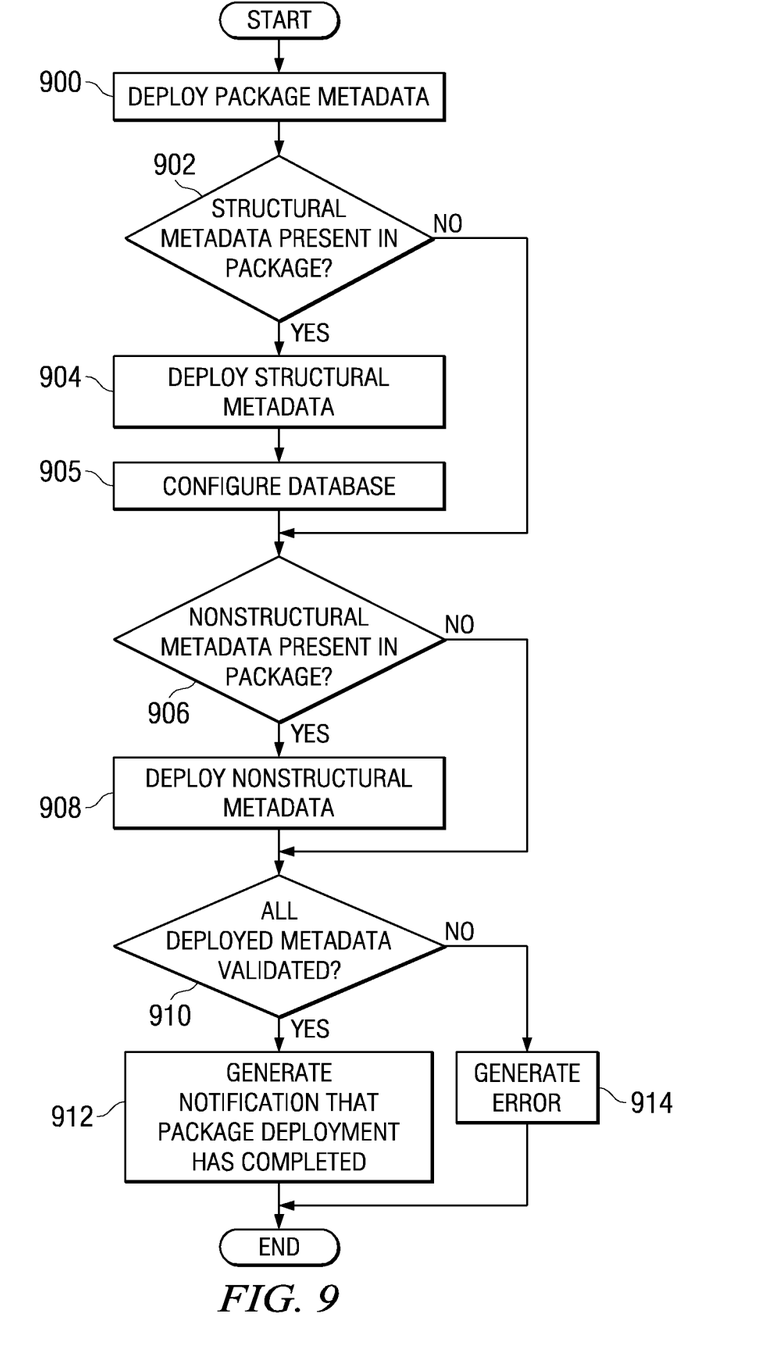
FIG. 9 is a flowchart of a process for deploying an application in accordance with an illustrative embodiment.

With reference now to FIG. 9, a flowchart of a process for deploying an application is depicted in accordance with an illustrative embodiment. The process illustrated in FIG. 9 may be implemented in a software component, such as package deployment processing 410 in FIG. 4.

The process begins by deploying package metadata (step 900). In these illustrative examples, the deployment of metadata may include unpacking or removing the metadata from the package. Further, the deployment of the metadata also includes processing the metadata to create database entities. These entities include database tables, views, columns, indexes, keys, and sequences. These are referred to as structural metadata.

Thereafter, a determination is made as to whether structural metadata is present in the package (step 902). If structural metadata is present in the package, the structural metadata is deployed (step 904). The structure metadata deployed in step 904 describes changes to be made to various structures. A structure is a component or item that can hold data. A structure includes, for example, tables, views, columns, keys, indexes, and other suitable items in a database. These changes may be loaded into a set of configurations of metadata tables.

The different illustrative examples launch a database configuration process to perform the required database changes using this structural metadata and execute appropriate database commands to make the changes. The process then configures the database (step 905). In configuring the database in step 905, the process operates on "database objects" or "structural entities". These objects include, for example, tables, views, index, sequences, triggers, and other suitable database objects.

When configuring the database based on metadata in the package, multiple tables, views, and other objects may be created or changed or deleted. Step 905 may comprise of performing database operations which operate on database objects. The database operations comprises at least one of create a table, alter the table, drop the table, create a view, alter the view, drop the view, create indexes, drop the indexes, create a sequence, alter the sequence, drop the sequence, create a trigger, and drop the trigger.

As used herein, the phrase "at least one of", when used with a list of items, means that different combinations of one or more of the items may be used, and only one of each item in the list may be needed. For example, "at least one of item A, item B, and item C" may include, for example, without limitation, item A, or item A and item B. This example also may include item A, item B, and item C, or item B and item C.

A determination is then made as to whether nonstructural metadata is present in the package (step 906). If nonstructural metadata is present in the package, the nonstructural metadata is deployed (step 908).

A determination is then made as to whether all of the deployed metadata has been validated (step 910). If all of the deployed metadata has been validated, a notification is generated that the package deployment for the application has been completed (step 912) with the process terminating thereafter.

With reference again to step 910, if all of the deployed metadata has not been validated, an error is generated (step 914) with the process terminating thereafter. With reference again to step 906, if nonstructural metadata is not present in the package the process proceeds to step 910 directly. With reference back to step 902, if structural metadata is not present in the package, the process proceeds to step 906 directly.

Figure 10:
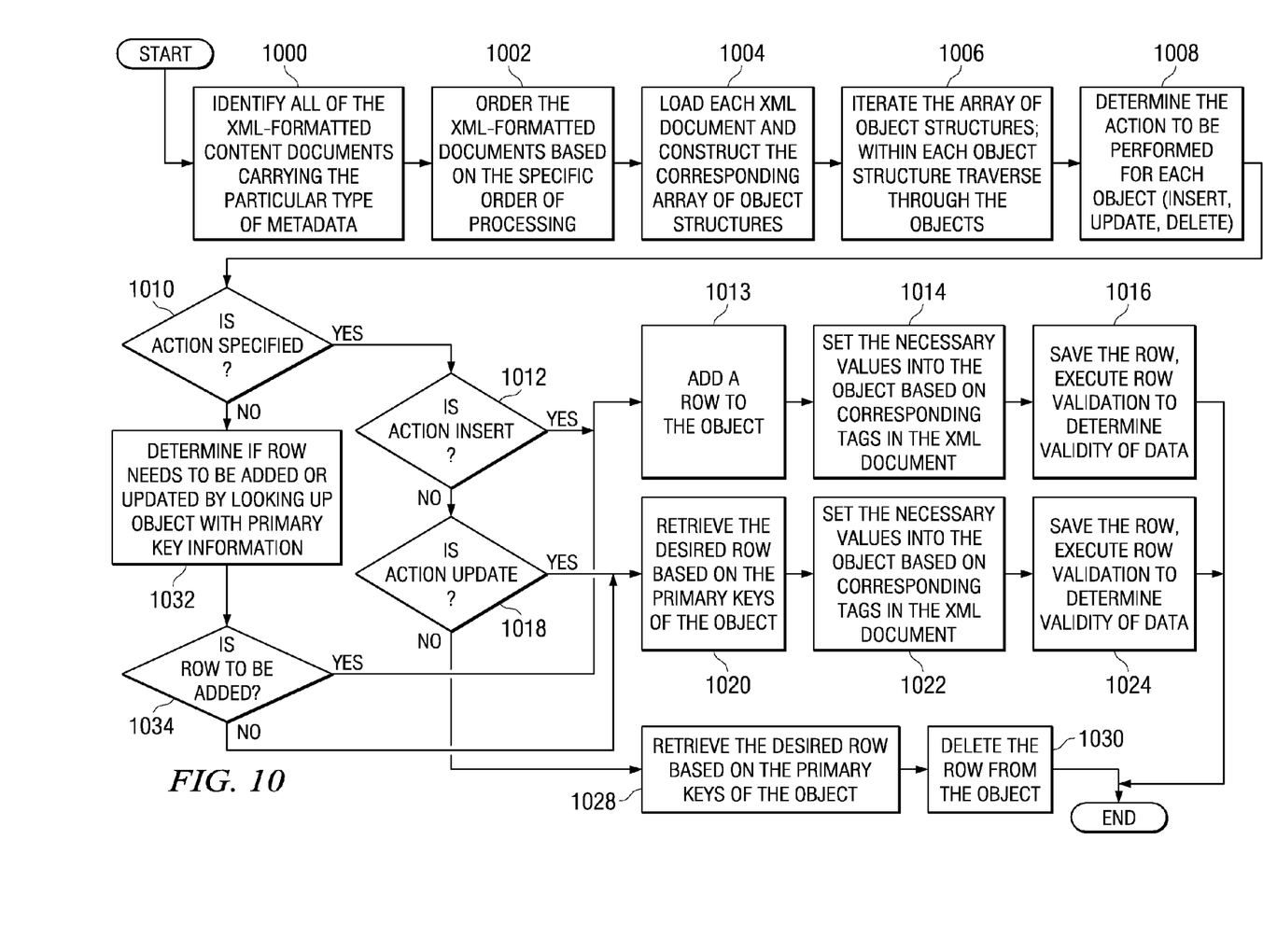
FIG. 10 is a flowchart of a process for deploying metadata in accordance with an illustrative embodiment.

With reference now to FIG. 10, a flowchart of a process for deploying metadata is depicted in accordance with an illustrative embodiment. The process in FIG. 10 is a more detailed illustration of a deployment step, such as those found in steps 906, 910, and 912 in FIG. 9.

The process begins by identifying all extensible markup language documents having the selected type of metadata to form a set of identified extensible markup language documents (step 1000). These documents are identified as being of a particular type of metadata. For example, the process may identify all of the extensible markup language documents that relate to package metadata, structural metadata, or nonstructural configuration metadata.

The process then orders the extensible markup language formatted documents based on a specific order of processing (step 1002). In these examples, the order in which extensible markup language documents are processed may follow in order of the logical workflow process that may be found in the application being deployed. Some metadata may have dependencies on other metadata in other extensible markup language documents, requiring the meta data to be processed before other meta data. Processing content out of order may result in the application not functioning properly. The process loads each extensible markup language document and constructs the corresponding array of object structures (step 1004).

An array of object structures is created based on the content of the extensible markup language document. This array of object structures may be, for example, a set of tables, views, indexes, or any other suitable object structures. By using an object form, more information may be stored in an object than using a record in a table record.

The process then iterates the array of object structures and then each object structure traverses through the object (step 1006). Next, the process identifies the action to be performed for each object (step 1008). The action may be specified along with the metadata in the extensible markup language document or may have to be determined dynamically.

The action specified may include, for example, inserting, updating, or deleting an entity. If the specified action is to insert, a row may be added to the object; if the specified action is to update the object, a desired row may be retrieved based on primary keys of the object and the necessary values may be placed into the object based on identifying the appropriate metadata in the extensible markup language document. In inserting the row, values may be set in the row based on metadata from the extensible markup language document. If the specified action is to delete, a row may be deleted from the object based on primary keys of the object.

A determination is made as to whether an action has been specified (step 1010). If an action has been specified, a determination is made as to whether the action is an insert action step 1012. If the action is an insert action, a row is added to the object (step 1012). Then, the process sets the necessary values into the object based on corresponding tags in the extensible markup language documents (step 1014). These corresponding tags are one that correspond to the object and identify the values needed for the object.

The process then saves the row and executes a validation process on the row to determine the validity of the data within the row (step 1016). Validation is performed on an object to determine whether the object has been correctly constructed or is valid. The validation may include, for example, verifying whether values and/or dependencies are correct. For example, if the object is a record or row for an email notification, a recipient value must be specified to whom the email notification can be sent to. If no recipient value is present, then the email notification object is considered to be invalid. In another example, a workflow process record or row may require an email notification to be sent as part of the process. A node in the workflow process specifies the particular email notification. When the workflow process record is created or updated based on the metadata in the extensible language markup document, validation is performed to determine if the email notification is already present. If the required email notification is not present, then the workflow process is considered to be invalid. In other embodiments, other types of validations may be performed that are suitable for the particular object being validated.

With reference again to step 1012, if the action is not an insert action, a determination is made as to whether the action is an update action (step 1018). If the action is an update action, the desired row is retrieved based on the primary keys of the object (step 1020). In these examples, the primary keys act as an index to the row. The action includes the primary keys so that the appropriate object may be identified. The process then sets the necessary values into the object based on the corresponding tags and the extensible markup language document (step 1022). The process then saves the row and executes row validation to determine the validity of the data (step 1024), with the processing terminating thereafter.

With reference again to step 1018, if the action is not an update action, the action is a delete action. The process retrieves the desired row based on the primary keys of the object (step 1028). The process then deletes the row from the object (step 1030) with the process terminating thereafter.

With reference again to step 1010, if no action is specified, a determination is made as to whether a row needs to be added or updated by looking up the object with the primary key information (step 1032). Next, the process determines if a row is to be added (step 1034). If a row is to be added, the process proceeds to step 1013 as described above. Otherwise, a row is to be updated and the process proceeds to step 1020 as described above. The case where row does not need to be updated or added does not arise. If the package contains metadata for a particular row, then one of the three actions must be performed—insert, update or delete. If there is no metadata for a row in a package, then that row is unaffected by package deployment.

Thus, the different advantageous embodiments provide a computer implemented method, apparatus, and computer usable program code for distributing packages to deploy software applications. In the different illustrative embodiments, a first portion of metadata describing a package is processed in response to a request to deploy a package. A second portion of the metadata relating to modifications of the database is processed after processing the first portion of the metadata. A third portion of the metadata describing content for the database may be processed after the second portion has been processed in these examples. Of course, depending on the particular implementation, a package may not include all three types of metadata described in the different illustrative examples. In these examples, all the packages may include the first portion of metadata while the second and third portions may be optional depending on the particular deployment.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deploying a package for a software application, the package comprising metadata that includes multiple portions that are identified with an order for processing the multiple portions, the computer implemented method comprising:

responsive to receiving a request to deploy the package comprising the metadata, processing a first portion of the metadata describing the package;

processing a second portion of the metadata defining configurations to be made to a database for the software application after processing the first portion of the metadata;

processing a third portion of the metadata describing all other content for the software application after processing the second portion of the metadata; and configuring the database using the second portion of the metadata after processing the second portion of the metadata and prior to processing the third portion of the metadata;

wherein the step of processing the first portion of the metadata, the step of processing the second portion of the metadata, and the step of processing the third portion of the metadata comprising:
  validating each portion of the metadata during processing of each of the first portion, the second portion and the third portion of the metadata;
  identifying a set of extensible markup language documents containing the first portion of the metadata, wherein the set of extensible markup language documents has an order with respect to one another;
  constructing a set of objects for each extensible markup language document in the order for the set of extensible markup language documents; and
  performing an action on each object in the set of objects based on the order for the set of extensible markup language documents.

2. The computer implemented method of claim 1, wherein configuring the database comprises performing a plurality of database operations which operate on database objects, wherein the plurality of database operations comprises at least one of create a table, alter the table, drop the table, create a view, alter the view, drop the view, create indexes, drop the indexes, create a sequence, alter the sequence, drop the sequence, create a trigger, and drop the trigger, wherein the software application is a remote web based application that executes through a browser running on a local computer that performs the processing of the first, second and third portions of the metadata.

3. The computer implemented method of claim 1 further comprising: generating a notification after all processing of the metadata has successfully completed to indicate that deployment of the software application is completed, wherein the metadata is used to make the software application resident on a remote data processing system available to an end user of a local data processing system.

4. The computer implemented method of claim 1, wherein the action is selected from at least one of inserting a row in the database, updating the row in the database, and deleting the row in the database, and wherein user interfaces for the software application are created using the database.

5. The computer implemented method of claim 1, wherein the step of processing the various portions of the metadata comprises:
  constructing a set of object structures corresponding to a first extensible markup language document in an order for the set of extensible markup language documents, wherein each object structure in the set of object structures contains a set of objects;
  performing an action on each object in the set of objects; and
  repeating the constructing and performing steps for each subsequent markup language document in the order for the set of extensible markup language documents.

6. The computer implemented method of claim 1, wherein the metadata is stored in a plurality of extensible markup language documents.

7. The computer implemented method of claim 1, wherein the database is selected from one of a relational database and an extensible markup language database, and wherein the package is deployed by creating database entities in the database.

8. The computer implemented method of claim 1 further comprising:
  initiating the computer implemented method to deploy the package in a test environment; and
  after deploying the package in the test environment, subsequently initiating the computer implemented method to deploy the package in a production environment, wherein the package deployed in the production environment includes the same metadata as is included in the package deployed in the test environment and audit information pertaining to the package deployed in the test environment, wherein the audit information comprises what system the package was originally created, where the package is currently installed for testing, and where the package was regenerated for further downstream deployment in the production environment.

9. The computer implemented method of claim 1, wherein the step of processing a third portion of the metadata describing content for the database comprises one of placing data in a row in the database, changing the data in the row in the database, and deleting data in the row in the database.

10. A data processing system configured to deploy a package for a software application, the package comprising metadata that includes multiple portions that are identified with an order for processing the multiple portions, comprising:
  a bus; a communications unit connected to the bus; a storage device including program code; and a processor unit connected to the bus, wherein the processor unit executes the program code to
  process first portion of the metadata describing the package in response to receiving a request to deploy the package;
  process second portion of the metadata defining configurations to be made to a database for the software application after processing the first portion of the metadata;
  process a third portion of the metadata describing all other content for the software application after processing the second portion of the metadata; and
  configure the database using the second portion of the metadata after processing the second portion of the metadata and prior to processing the third portion of the metadata;
  wherein the step of processing the first portion of the metadata, the step of processing the second portion of the metadata, and the step of processing the third portion of the metadata to:
  validate each of the first portion, the second portion and the third portion of the metadata;
  identify a set of extensible markup language documents containing the first portion of the metadata, wherein set of extensible markup language documents has an order with respect to one another;
  construct a set of objects for each extensible markup language document in the order for the set of extensible markup language documents; and
  perform an action on each object in the set of objects based on the order for set of extensible markup language documents.

11. The data processing system of claim 10, wherein the processor unit further executes the program code to perform one of adding a row to the database, deleting the row in the database, and moving the row in the database, wherein the software application is a remote web based application that executes through a browser running on the data processing system.

12. The data processing system of claim 10, wherein the processor unit further executes the program code to generate a notification after all processing of the metadata has successfully completed to indicate that deployment of the software application is completed, wherein the metadata is used to make the software application resident on a remote data processing system available to an end user of a local data processing system.

13. A computer program product for deploying a package for a software application, the package comprising metadata that includes multiple portions that are identified with an order for processing the multiple portions, the computer program product comprising:
- a non-transitory computer readable tangible storage device;
- program code, stored on the non-transitory computer readable tangible storage device, responsive to receiving a request to deploy the package, for
- processing first portion of the metadata describing the package;
- program code, stored on the non-transitory computer readable tangible storage device, for processing second portion of the metadata defining configurations to be made to a database for the software application after processing the first portion of the metadata;
- program code, stored on the non-transitory computer readable tangible storage device, for processing a third portion of the metadata describing all other content for the software application after processing the second portion of the metadata; and
- program code for configuring the database using the second portion of the metadata after processing the second portion of the metadata and prior to processing the third portion of the metadata;

wherein the step of processing the first portion of the metadata, the step of processing the second portion of the metadata, and the step of processing the third portion of the metadata to:
- validate each of the first portion, the second portion and the third portion of the metadata;
- identify a set of extensible markup language documents containing the first portion of the metadata, wherein set of extensible markup language documents has an order with respect to one another;
- construct a set of objects for each extensible markup language document in the order for the set of extensible markup language documents; and
- perform an action on each object in the set of objects based on the order for set of extensible markup language documents.

14. The computer program product of claim 13, wherein the program code is downloaded over a network from a remote data processing system.

15. The computer program product of claim 13, wherein the program code is downloaded over a network from a remote data processing system and stored in the non-transitory computer readable tangible storage medium for use with the remote data processing system.

* * * * *